UNITED STATES PATENT OFFICE.

JOHN AULD AND JOHN GRAHAM, OF GLASGOW, SCOTLAND.

REDUCING-VALVE.

1,212,879.  Specification of Letters Patent.  Patented Jan. 16, 1917.

Application filed March 5, 1913. Serial No. 752,124.

*To all whom it may concern:*

Be it known that we, JOHN AULD and JOHN GRAHAM, subjects of the King of Great Britain and Ireland and the Isle of Man, and residents of Glasgow, Scotland, have invented new and useful Improvements in Reducing-Valves, of which the following is a specification.

This invention has reference to and comprises improvements in and relating to reducing valves for dealing with high pressures, such as air or gas compressed, it may be, to a pressure of 2,000 or 3,000 lbs. to the square inch, or other pressure fluid and consists in a novel combination of parts including the valve seat which is held in place by a plug screwed into the valve casing.

In order that others skilled in the art to which our invention relates may properly understand same, we have hereunto appended two sheets of illustrative drawings showing sectional elevations of two forms of such valves.

Figure 1:
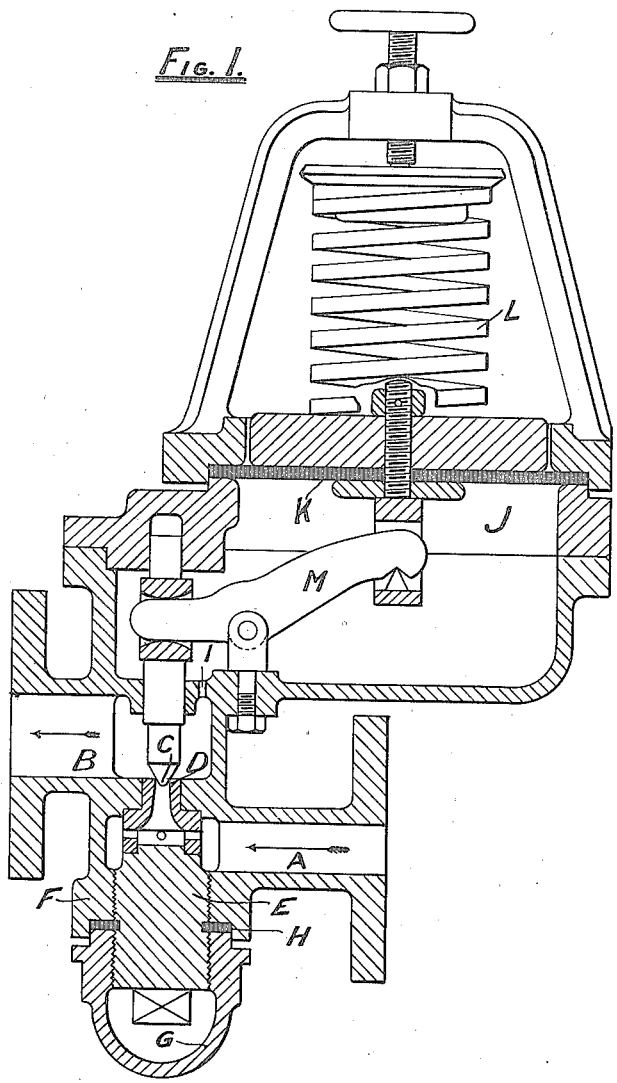
Figure 2:
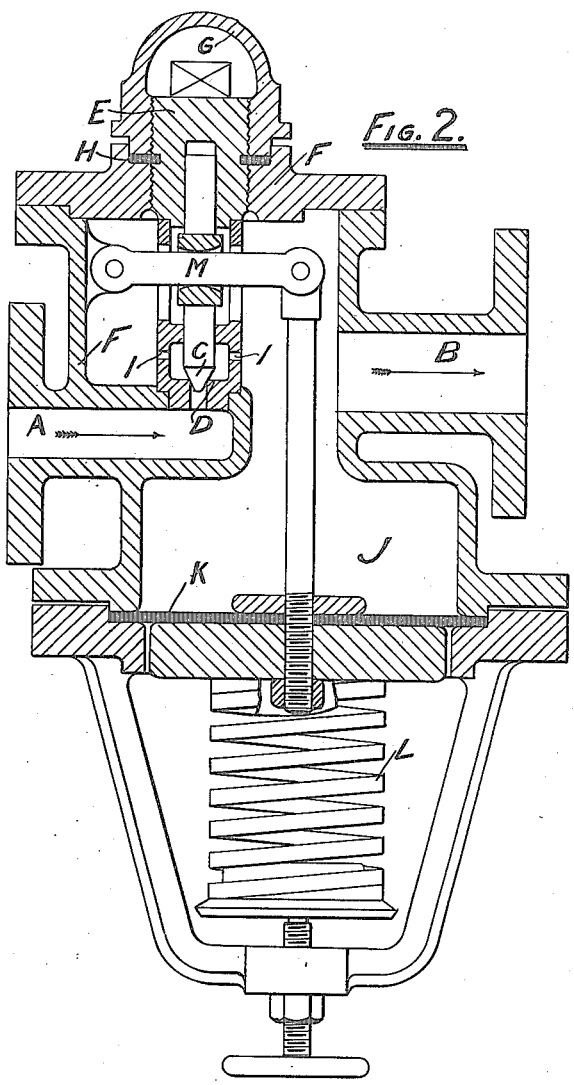

Referring to these drawings:—In carrying this invention into effect or practice as illustrated by Figures 1 and 2 in which the elements are similar, but differently arranged, the gas enters by the inlet passage A and passing the valve C flows away by the outlet passage B. The valve C is conical in form and is made of hard metal as also is its seat D. The valve seat D is maintained firmly in position by the plug E which is screwed into a tapped opening in the casing F, its end being covered by the cap G, and the connection made air tight by the washer or packing material H. The pressure fluid passing the valve C, passes direct to the outlet B, as shown in Fig. 1, and also by the hole I or holes to the diaphragm chamber J, and as shown by Fig. 2 it passes through the holes I into the diaphragm chamber J thence it flows off by the outlet B. The diaphragm K is acted on by the spring L, which is fitted with the ordinary pillars and adjustable cross head to open the valve, which is closed immediately the pressure in the diaphragm chamber J rises above that arranged for and overcomes the pressure of the spring L, the valve being actuated by means of the lever M fulcrumed on the casing F.

The action in both the arrangements shown is the same and is as follows:—The high pressure fluid entering by the inlet A passes through the valve seat structure,—the valve C being open—, and flows to the outlet B. It also flows to the diaphragm chamber J and when the pressure therein rises above that for which the spring L is set it acts on the diaphragm K to close the valve, and when the pressure in the diaphragm chamber J falls the valve is again opened by the action of the spring L.

What we claim and desire to secure by Letters Patent is:—

The combination in a valve, of a casing having inlet and outlet passages and a threaded opening; a valve seat mounted in a shouldered cavity in said casing and having a passage communicating with the inlet and outlet passages; a plug threaded into said opening and having a threaded portion projecting outside of the same, said plug engaging the valve seat to hold it against the shoulder of its cavity and being provided with a wrench-receiving head; with a cap threaded on the projecting portion of the plug so as to cover the head thereof; and packing between the edge of the cap and the adjacent portion of the casing.

In testimony whereof we have affixed our signatures in presence of two witnesses.

JOHN AULD.
JOHN GRAHAM.

Witnesses:
ROBERT CLEGHORN THOMSON,
JOHN STEWARD.